United States Patent [19]

Hentzen

[11] 4,168,928

[45] Sep. 25, 1979

[54] DISPENSING APPARATUS FOR TRAPEZOID-SHAPED OBJECTS

[76] Inventor: Christopher P. Hentzen, 1129 Mason Dr., Hurst, Tex. 76053

[21] Appl. No.: 871,776

[22] Filed: Jan. 24, 1978

[51] Int. Cl.² .............................................. B65G 59/06
[52] U.S. Cl. .................................... 414/131; 221/307; 414/786
[58] Field of Search ............. 214/1.5, 6.5, 6 M, 8.5 F, 214/152; 221/272, 274, 307; 53/142, 143, 144

[56] References Cited

U.S. PATENT DOCUMENTS

| | | | |
|---|---|---|---|
| 2,641,321 | 6/1953 | Cruzan | 214/8.5 F X |
| 2,688,413 | 9/1954 | Donehower et al. | 214/8.5 F |
| 3,695,461 | 10/1972 | Ginther | 214/8.5 F X |
| 4,067,457 | 1/1978 | Schiepe | 214/6 M |

*Primary Examiner*—L. J. Paperner
*Attorney, Agent, or Firm*—Charles W. McHugh

[57] ABSTRACT

A magazine adapted to feed trapezoid-shaped objects from its bottom, with each successive object being pushed sideward out of the magazine from its thick side, such that the first portion of the object to emerge from the magazine is the thin side. The magazine typically has a fixed front wall and a fixed back wall, at least one of which may be adjustable in order to accommodate objects of various widths. The objects rest face-to-back in a stack between the two walls. A floor supports the objects, and at least a portion of the floor is movable; and there is a gap between the movable floor portion and the bottom edge of the front wall. A portion of the movable floor is yieldable downwardly as an object is being pushed out of the magazine, and preferably this portion constitutes a spring-biased roller over which an object passes as it is ejected from the magazine. The magazine may be split into two or more segments that are widely separated, so as to accommodate very long objects—such as pieces of trimming for a door facing. One or more air cylinders or the like are employed to push the objects out of the magazine.

15 Claims, 7 Drawing Figures

DISPENSING APPARATUS FOR TRAPEZOID-SHAPED OBJECTS

This invention relates generally to an apparatus for sequentially feeding objects from the bottom of a magazine containing a stack of said objects. More particular, it relates to an apparatus for feeding objects having a trapezoid-shaped cross section, wherein a single object is pushed sideward out from the bottom of a stack of objects, and wherein the "thin" side of the object is the first side to emerge from the magazine.

There are many occasions when a plurality of objects are fed one at a time from a stack of objects, such as during the assembly of miscellaneous articles made from wood, including furniture, doors, etc. A common characteristic of most of these machines is that they are all adapted to hold and feed workpieces having a generally uniform cross section, that is, cross sections which are either square or rectangular. When the cross section of a workpiece is trapezoid-shaped or trapezoidal, the direction in which the bottom piece is to be moved becomes important, because pushing from the "thick" side presents radically different conditions than pushing from the thin side. For example, if an apparatus is designed to mechanically push against the thin side of a trapezoid-shaped workpiece, the thick side will initially emerge from a magazine, and the support rendered to the remaining workpieces in the stack above the piece being fed is progressively reduced. Hence, as the bottom piece is moved out of the magazine, the remaining pieces simply fall downward by a distance representing the difference between the thick and thin portions of the trapezoid-shaped piece. Then, when the pusher mechanism is withdrawn to its rest position, the next workpiece will typically fall still further so that it is ready to be pushed during the next cycle.

If, for some reason, it is important that a trapezoid-shaped workpiece be pushed out of a magazine from the thick side rather than the thin side, attention must be given to how the upper pieces are to be suspended or supported while the thick portion of the bottom piece is being moved with respect to the rest of the stack. And, if an auxiliary support is not employed, it is almost certain that the sideward pushing device would have to have enough strength so as to not only push the bottom piece sideways but also lift the remaining pieces in the stack in order to provide clearance for the thick part of the bottom piece. A solution to this problem has now been discovered, however, such that it is possible to feed trapezoid-shaped objects by pushing against the thick side, but which does not involve simultaneous lifting of the remaining pieces in the stack.

In brief, the invention encompasses a generally linear magazine for holding a plurality of objects, one above another, and each having a trapezoid-shaped cross section. The magazine has a fixed front wall, a fixed back wall, and a supporting floor for holding the objects between the two walls. A gap is provided between the bottom edge of the front wall and the floor, with said gap being about as wide as the thin portion of the trapezoid-shaped objects but more narrow than the thick portion of said objects. A slide or carriage is provided to bear against the thick edge of the objects, so as to push the thin edge of the object initially out of the gap. The floor is arranged to translate with the carriage in order to support the object being fed as it passes beneath the front wall; and, said floor is also pivotable (downwardly) with respect to the carriage in order to accommodate the full thickness of the object as it is being fed under the front wall. Additionally, it is preferred that another structural element be movable with the carriage to temporarily support the remaining objects in the stack during that time that the bottom object is being expelled. When the carriage withdraws to its original position, a fresh object falls downward and rests on the floor, where the object is ready to be expelled by the next excursion of the carriage. Preferably, the bottom object in a stack of objects has its upper surface parallel to the excursion path of the carriage, so that forward translation of the carriage does not cause the object being expelled to exert any kind of a lifting force on the remaining objects in the stack.

Figure 1:
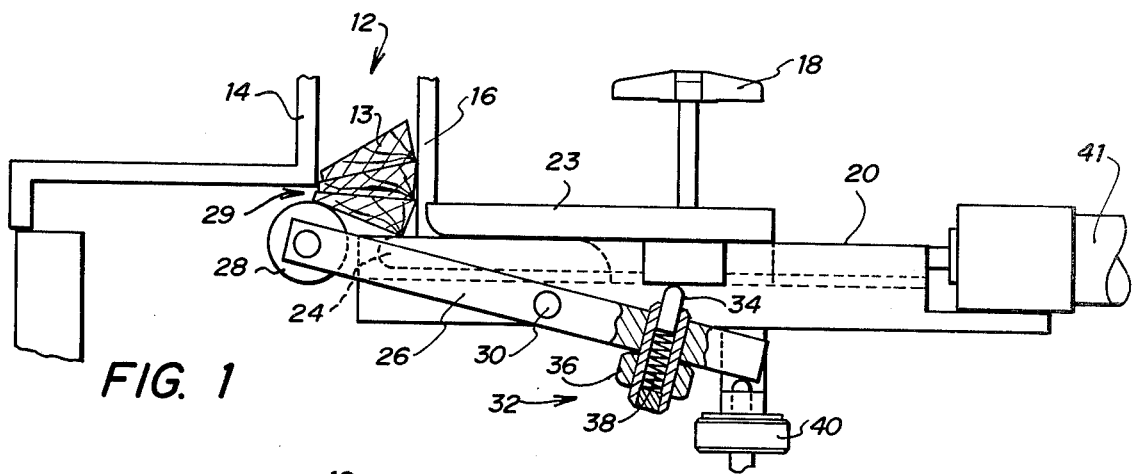
FIG. 1 is a partially sectioned, elevational view of an apparatus including a magazine having a plurality of objects therein, each object having a trapezoid-shaped cross section and the objects being seen from one end thereof.
Figure 2:
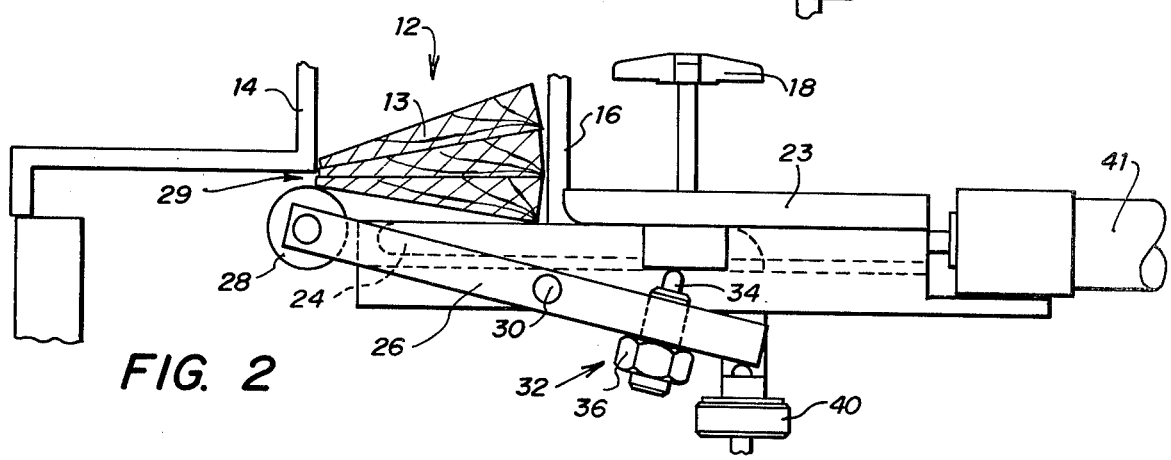
FIG. 2 is a partially sectioned, elevational view of the apparatus shown in FIG. 1, with said apparatus being adjusted to accommodate trapezoid-shaped objects (such as pieces of door trim) having a width and thickness different than those shown in FIG. 1.

Referring initially to FIGS. 1 and 2, a plurality of objects having a trapezoid-shaped cross section are shown stacked one above the other in an apparatus 10, which may typically be part of a machine for nailing pieces of trim on door jambs, etc. It should be understood, however, that this invention is not restricted to use on machinery for fabricating doors or the like. Rather, the apparatus 10 should be appreciated as having utility in essentially any situation where it may be desired to feed a trapezoid-shaped object from the "fat" side of the object—rather than the much easier "thin" side. The apparatus 10 includes a linear magazine 12 for holding the objects 13 in a stacked mode. When the magazine 12 is oriented vertically (as shown), gravity may be relied on to supply a fresh object whenever the bottom object has been discharged. If the magazine 12 is oriented in some way other than vertically, a spring or the like may furnish the requisite force to urge the plurality of objects 13 toward the discharge opening. Hence, it should be appreciated that the exact inclination of the magazine 12 is not critical. Furthermore, the exact size and shape of the objects or workpieces is not critical, either, with FIG. 1 showing the apparatus loaded with objects of a first size and FIG. 2 showing the same apparatus adjusted to accommodate objects of a larger size.

In the embodiment shown in FIG. 1, the magazine 12 has a fixed front wall 14 and a fixed back wall 16, with the walls being separated by a distance just slightly wider than the objects 13, in order that said objects will fall freely toward the bottom of the magazine as successive objects are discharged. While the two walls 14, 16 are described as being fixed, they need not be permanently fixed; and, for an apparatus 10 which is usable with a door framing machine, it is highly advantageous to make at least one of the two walls adjustable in position. Typically, it is the back wall 16 which is adjustable with a clamping means 18 serving to hold an L-shaped extension of the rear wall fixed with respect to a frame 20.

Figure 3:
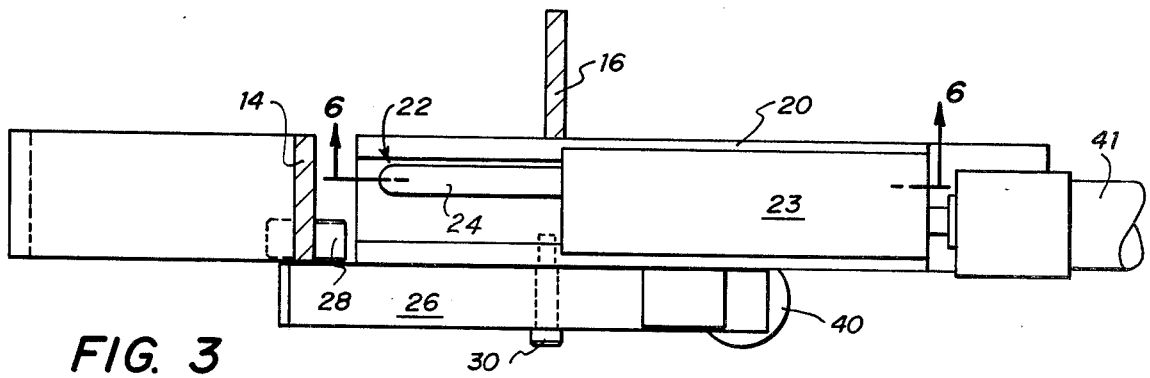
FIG. 3 is a top, plan view of the apparatus shown in FIG. 1, with substantial portions of the frame, etc., being omitted for clarity.

Referring additionally to FIG. 3, the objects 13 are obviously resting face-to-back in a stack between the two walls 14, 16, where they are supported by what will be called a movable floor 22. The floor 22 includes one non-rotatable part or rod 24 and a rotatable arm 26 having a support roller 28 at a distal end. The length of the arm 26 between its pivot axis 30 and the peripheral surface of the roller 28 is such that the thin portion of an object 13 will come to rest on top of the roller 28 and the thick portion of the object will rest on the non-rotatable portion 24 of the carriage 23. As shown in FIG. 1, the arm 26 also carries a spring-biased means 32 having a plunger 34 which is adapted to bear against a rigid portion of the frame 20. By adjusting the position of the nut 36, the compressive force on an internal spring in means 32 may be altered, which naturally will affect the resistance of the roller 28 (on the other end of arm 26) against downward movement. Additionally, a mechanical stop 40 is provided on the frame 20 in order to provide absolute control over one extreme position of the arm 26.

The excursion path for the carriage 23 is in a direction parallel to the longitudinal axis of the carriage, i.e., horizontal in the illustration of FIG. 1. Preferably, the spring-biased means 32 is adjusted in order to place the roller 28 at such a position that the top surface of the bottom object 13 is also horizontal. Accordingly, when the carriage 23 translates horizontally in response to actuation of a fluid-operated cylinder 40, the bottom object 13 will be pushed to the left without exerting any upward force on the remaining objects in the magazine 12. As an object 13 is pushed to the left, the spring-biased arm 26 rotates counter-clockwise, providing increasing clearance for the object 13 to pass beneath the fixed front wall 14. Naturally, the spring constant of means 32 is selected so as to be compatible with the force which be exerted by cylinder 40; additionally, the weight of the stack of objects 13 may have some impact on selection of a particular spring.

Figure 4:
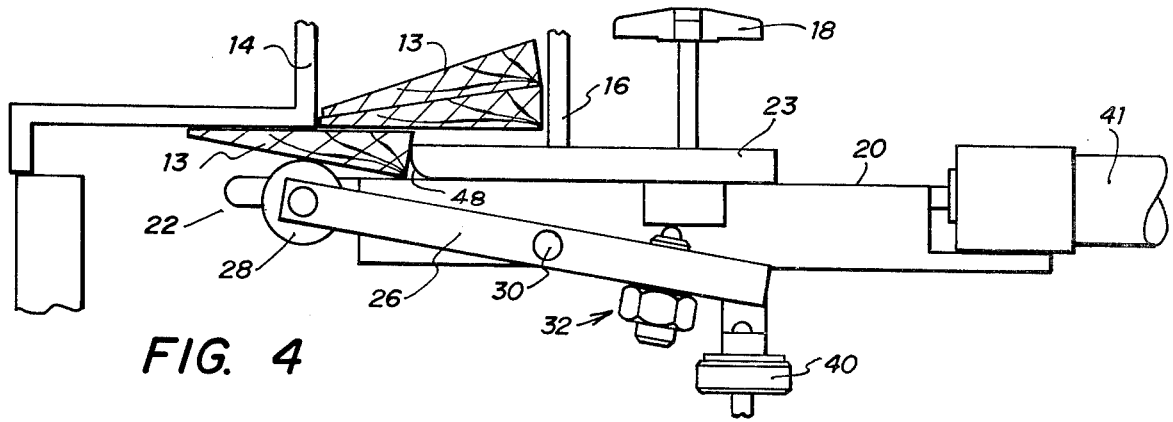
FIG. 4 is an elevational view similar to FIG. 1, and showing the bottom object in the process of being expelled from the magazine, with the pushing force being exerted in a direction which is approximately parallel to one of the major faces of the bottom object.
Figure 5:
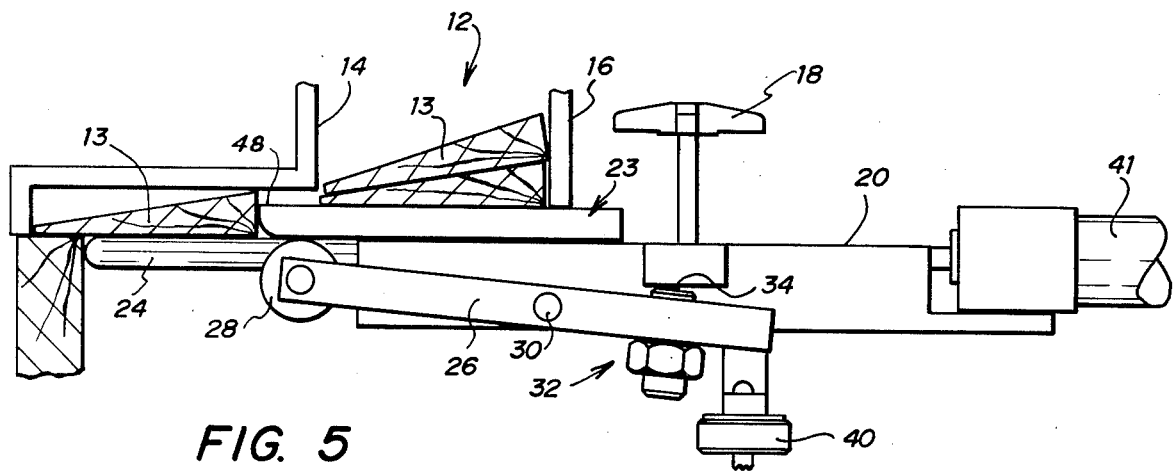
FIG. 5 is an elevational view similar to FIG. 4 and showing the object after it has been expelled from between the two confronting walls of the magazine but while it is still temporarily supported by a portion of the movable floor.
Figure 6:
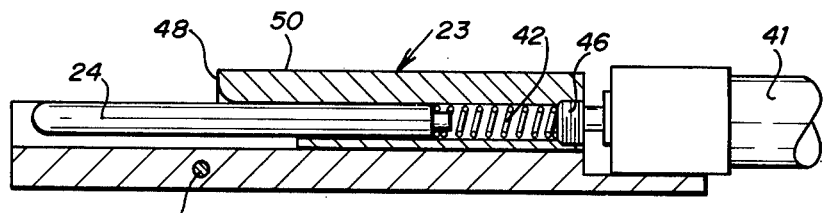
FIG. 6 is an elevational view, partially in cross section, taken in the plane represented by line 6—6 in FIG. 3, and showing a movable carriage (having a spring-biased pin mounted thereon) which translates with respect to a fixed frame—such as the frame of a machine for receiving partially completed door jambs in a factory for mass-producing said door jambs, etc.

The movement of the carriage 23 and the respective positions of various elements are shown in FIGS. 4 and 5. Referring specifically to FIG. 4, it shows an object which has been partially pushed out from under the stack of objects by member 48. Attention is directed to the fact that roller 28 has yielded to the force exerted by pusher 48, and has dropped away from the bottom of fixed wall 14—providing adequate clearance for the increasing thickness of object 13 as it moves to the left. Eventually, the object 13 will pass completely over roller 28, such that it is technically out of the magazine 12. But until such time as the object is secured to some structure, it is frequently desirable that it be supported. In FIG. 5 there is shown a fragmentary portion of an exemplary door jamb to which a piece of door trim is to be nailed. Until automatic nailing machines have been moved into position to fix the trim to the door jamb, it is advantageous that the support pin 24 hold the trim in a position to foster accurate alignment and nailing. After the trim has been nailed to the jamb, the entire carriage 23 will retract to its starting position (shown in FIG. 1). If the desire to support a piece of trim for a significant distance could possibly cause interference with some structure at a later time, it is possible to mount the support pin 24 in such a way that it is capable of being telescoped within the carriage 23 by at least a small distance. This is done by placing a compression spring 42 behind the support pin 24, so that the pin may slide with respect to a bore in carriage 23. The compression spring 42 is held in place in the carriage 23 by threaded plug 46, shown in FIG. 6. In this particular embodiment, then it will be understood that the "movable floor" which supports a stack of objects 13 is actually formed by support pin 24 and a peripheral portion of roller 28 (near the top of the roller).

In order to foster the smooth feeding of a fresh object after the previous object has been discharged, it is preferred that the pusher 48 on carriage 23 has a top surface 50 which lies in a plane substantially parallel to the excursion path of carriage 23. When the bottom object 13 has been pushed sufficiently to the left so that it no longer supports the remaining objects by itself, those objects will typically fall by a small distance until the bottom face of the next object comes to rest on top surface 50. Because top surface 50 is moving horizontally with the carriage 23, there is no lifting load applied to the stack of objects 13 during such time as the carriage moves initially to the left and then back to its rest position at the far right. After the carriage has returned to its rest position behind rear wall 16, the next object 13 will be free to fall downward until it is halted by support pin 24, where it is then ready to be pushed by member 48 on the carriage. The same cycle is then repeated in order to place each successive object 13 in a position to be ejected from the bottom of the magazine.

As for the magazine itself, it should be apparent that the front and rear walls 14, 16 need not be straight; and, if the objects 13 have a substaintial taper between their thin and fat edges, then it may be advantageous to create a magazine whose confronting walls are slightly curved—somewhat like a banana. With such a configuration, a greater number of trapezoid-shaped objects can be stored in a magazine without running the risk of a particular object becoming skewed and/or stuck in the magazine. It should be remembered, too, that it is not necessary that the apparatus be oriented such that the walls 14, 16 are vertical—even if they are straight.

In view of the fact that it is contemplated that an apparatus 10 might be installed as a part of some essentially automatic door-making machinery, it is advantageous to insure that a piece of door trim would not be transferred to a nailing position if it was somehow manually loaded in the magazine backwards. This is accomplished with the apparatus 10 by insuring that the initial gap 29 between roller 28 and front wall 14 is large enough to pass the thin side of an object but not large enough to pass the thick side of said object. Then, if the air cylinder 41 operates to translate the carriage 23 with the thick edge of object 13 forward, the thick edge will butt against front wall 14, preventing the object from going any further and actuating an alarm or the like, so that a machine operator will be informed of a malfunction. The cure for such a malfunction is simply to return the apparatus 10 to its rest position and pull the improperly oriented object 13 from one end out of the magazine 12. In this way, an error in orientation of an object may be corrected before that object is moved to the next position in an assembly line, where it might be nailed to a door jamb in a reversed condition. The significance of halting operation of the apparatus 10 when the misorientation of an object 13 can be easily curred (instead of waiting until it has already been nailed to another piece) should be easily recognized—because it is far easier to reverse a piece of trim before it is nailed to a door jamb, etc.

Figure 7:
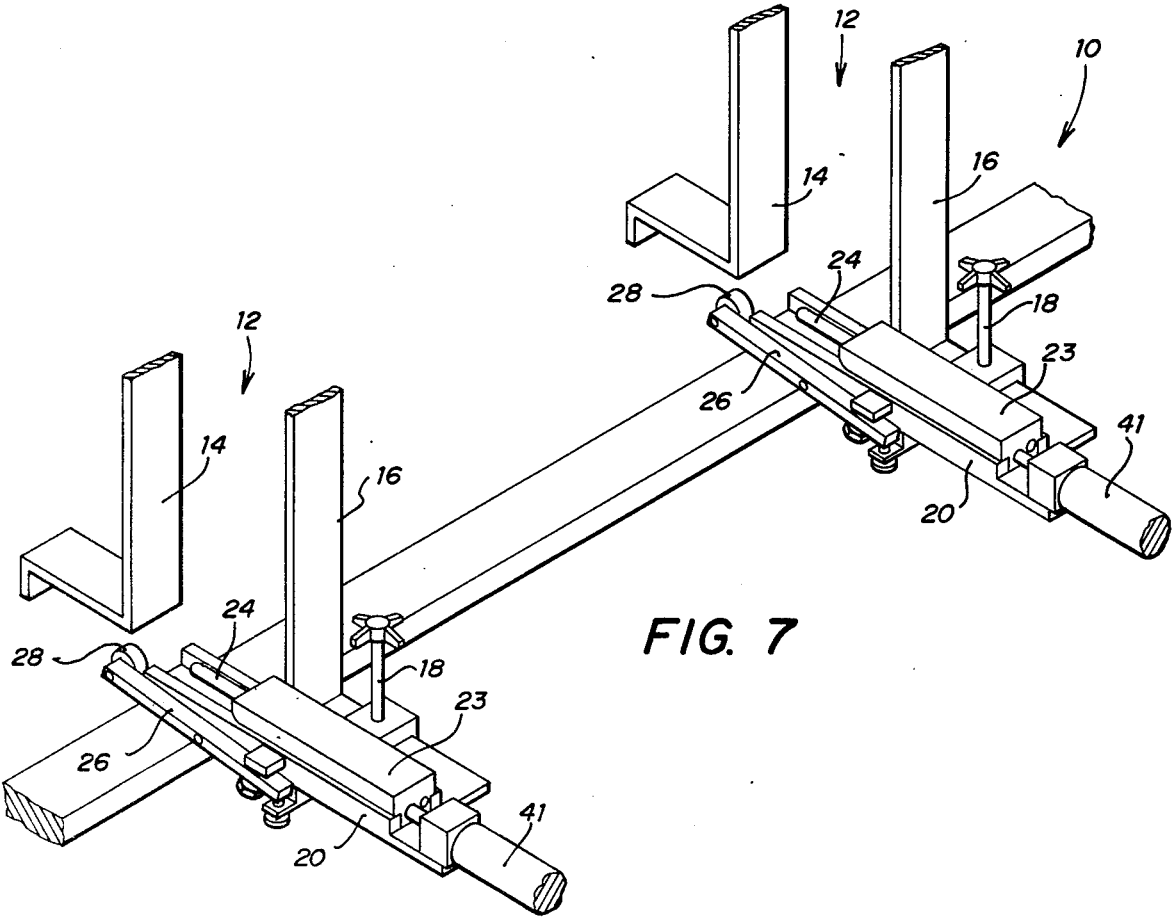
FIG. 7 is a perspective view of a dispensing apparatus wherein the supporting walls of a magazine are split into widely separated segments, whereby relatively long objects (such as pieces of door trimming) may be accommodated without requiring massive structures, etc.

Another feature of the apparatus 10 is that the front and back walls 14, 16 need not be significantly long in order to control the feeding of long objects. That is, it is quite possible to separate either the front wall 14 or the back wall 16 or both into widely spaced, but coplanar, sections—as shown in FIG. 7. In such an embodiment, there would typically be a fluid-operated cylinder 41 associated with each of the spaced wall sections for simultaneously feeding an elongated object at both ends thereof.

In operation of the apparatus 10, a machine operator would first examine the object to be fed and would establish the distance between the front and rear walls 14, 16 to provide only a small clearance beyond the width of the objects 13. Next, a single object would be positioned at the bottom of the magazine 12 in a position to be ejected. The set screw 40 at one end of arm 26 would then be adjusted so that the roller 28 at the opposite end of the arm is separated from the bottom of front wall 14 by a gap 29 which is just slightly larger than the thin portion of the trapezoid-shaped object. Perhaps it would be appropriate at this time to comment on the difficulty which would arise if the size of the initial gap 29 was substantially greater than the thickness of the thin edge of an object, i.e., more than twice said thicnkess. In such a case, it might be possible for the thin edges of two objects to enter the gap simultaneously; then, when the bottom object was pushed by pusher 48, a wedging action would be obtained. Such a wedging action might even lock up the entire machine, making it impossible to discharge any more objects until an operator manually released the bottom object by prying it loose. Hence, the gap 29 should always be adjusted in order to be initially less than twice the thickness of the thin edge of the objects 13.

If the top face of the bottom object 13 is not approximately parallel to the excursion path of carriage 23, the relative height between the front wall 14 and the carriage 23 could be slightly adjusted. However, a relatively small inclination of the top surface of the object 13 might not be deleterious—if the weight of a large stack of objects is not very great, or if a substantial pushing force is achievable with the fluid cylinder 41. With such "set up" adjustments as are appropriate having been made, the magazine 12 can then be fully loaded with additional objects, and the apparatus 10 is ready for use. In practice, it requires no more than a few seconds to drop one of the objects to an eject position, push it out from under the stack of other objects, and then return the carriage to a position where it may receive the next object that is to be fed. Indeed, the speed of feeding pieces of door trim to a nailing machine typically can occur much faster than the door jambs can be moved into position for receiving the trim pieces. Hence, the speed of operation of such an automatic apparatus is basically determined by how fast door jambs can be furnished—not by how fast trim pieces can be supplied and automatically nailed.

It is always possible, of course, that after a plurality of doors have been processed in the above-described manner, there will be a requirement for a different size door to be manufactured; or, a different size trim may be needed on a particular batch of doors. The technique for converting from one size object to another will typically involve the adjustment of one element (such as wall 16) for the width of the object and a second element (set screw 40) for its thickness. Of course, if the objects are long and there are several widely separated feeding devices 10, then adjustments are made at every such feeding device. In a relatively short period of time, though, a door trim machine can be adjusted to handle most any size of door trim.

Perhaps it should be mentioned, too, that the spring-loaded member 24 (which supports an object for a short while after it has been expelled from the magazine) is capable of accommodating pieces of door trim of many widths—as well as door jambs or headers of various thickness. That is, there is no risk of intereference between a support member 24 and a door jamb when the carriage 23 moves forward—as long as the member is yieldably supported by a means such as compression spring 42. Hence, various sizes and shapes of cooperating workpieces are readily accommodated by the apparatus disclosed herein.

While only one preferred embodiment has been described herein in great detail, it should be apparent to those skilled in the art that modifications thereof can be readily accomplished without departing from the spirit and scope of the invention. Accordingly, the invention should be understood to be limited only by the claims appended hereto.

What is claimed is:

1. Apparatus, comprising:
   (a) a generally linear magazine for holding a plurality of objects having a trapezoid-shaped cross section, said magazine having a fixed front wall and a fixed back wall, and the walls being separated by a distance just slightly wider than the objects, and the objects resting face-to-back in a stack between the two walls, and there being a movable floor for supporting the objects between the two walls, and there being an initial gap between the movable floor and the bottom edge of the fixed front wall, with the initial gap being slightly larger than the thin portion of said trapezoid-shaped objects but smaller than the thick portion of said objects, and the objects being oriented in the magazine with their thin edges toward the fixed front wall;
   (b) means for feeding a single one of the trapezoid-shaped objects from the bottom of the stack by moving said object toward the front wall; and
   (c) spring-biased means for temporarily lowering at least a portion of the movable floor as the object being fed passes beneath the fixed front wall, so as to provide clearance for the thick portion of the object to pass below said front wall and out of the magazine.

2. The apparatus as claimed in claim 1 and further including means for adjusting the amount by which a portion of the movable floor is lowered when the object is pushed below the front wall, whereby the apparatus may be adjusted to accommodate objects of various thicknesses.

3. The apparatus as claimed in claim 1 wherein said means for feeding a single object constitutes a fluid-operated cylinder and a pusher plate connected to said cylinder, with the pusher plate being adapted to bear against the thick edge of the object.

4. The apparatus as claimed in claim 1 wherein at least a portion of said movable floor constitutes a roller mounted at the distal end of a pivotable arm.

5. The apparatus as claimed in claim 1 wherein said front and rear walls are split into at least two spaced sections, and the length of the objects which can be accommodated by the apparatus is increased by separating said spaced sections while maintaining them in a common plane, and there being a fluid-operated cylinder associated with each of the spaced wall sections for simultaneous feeding at spaced portion of an elongated object.

6. The apparatus as claimed in claim 1 wherein a portion of the movable floor constitutes a member which translates with said means for feeding a single object, and said member having a length so as to temporarily support the fed object immediately after it is ejected from the magazine, and wherein said member for supporting the fed object is resiliently mounted on a carriage which constitutes a part of said means for feeding a single one of said objects, such that said resiliently supported member may telescope within the carriage at one extreme position of said carriage.

7. The apparatus as claimed in claim 1 wherein a portion of the movable floor is tilted upward in the region of the front wall, such that a trapezoid-shaped object lying on the movable floor has its upper surface nearly horizontal and the bottom surface of the next higher object is similarly horizontal, whereby moving the bottom object from a stack of objects may be accomplished by moving a flat member adjacent a horizontal surface of the next higher object in the stack, and whereby the stack does not have to be lifted in order to push the bottom object out of the magazine.

8. The apparatus as claimed in claim 7 wherein the upwardly tilted portion of the movable floor constitutes a peripheral portion of a roller along which the object passes as it is pushed from the magazine.

9. The method of feeding a trapezoid-shaped object from the bottom of a magazine full of such objects, comprising the steps of:
 (a) pushing the bottom one of the trapezoid-shaped objects in a direction which is approximately parallel to at least one of its major faces, and said pushing being against the thick edge of the object and in the direction of the thin edge thereof, such that the thin edge of the object is the first to emerge from the magazine through a gap below the fixed front wall of the magazine;
 (b) progressively increasing the size of the gap below the fixed front wall by lowering at least a portion of the magazine floor as the object is being pushed from the magazine; and
 (c) restoring the gap to its original size before the next object is positioned so as to be subsequently pushed out of the magazine.

10. The method of feeding a trapezoid-shaped object as claimed in claim 9 wherein the gap below the front wall is progressively increased by temporarily lowering a support member which is located below the front wall of the magazine as the object which is being expelled passes below the front wall and out of the magazine, and the extent to which the support member may be lowered is controllable by selectively adjusting at least one physical stop against which the support member bears when it has reached the extent of the desired travel.

11. The method of feeding a trapezoid-shaped object as claimed in claim 10 wherein the support member is temporarily lowered by pushing against it with the object being expelled, and said support member having a roller thereon to foster relative movement between said support member and the object being expelled.

12. The method of feeding a trapezoid-shaped object as claimed in claim 10 wherein the bottom face of the next-to-bottom object is positioned so that it is horizontal, and the bottom object is also pushed in a substantially horizontal direction, whereby no lifting force is exerted on the remaining objects in the magazine as the bottom object is pushed from the magazine.

13. Apparatus, comprising:
 (a) a generally linear magazine for holding a plurality of objects having a trapezoid-shaped cross section, said magazine having a fixed front wall and a fixed back wall, and the walls being separated by a distance just slightly wider than the objects, and the objects resting face-to-back in a stack between the two walls, and there being a means for supporting the objects between the two walls, and there being a gap through which a single one of the objects may pass adjacent the bottom edge of the front wall;
 (b) a carriage adapted for sliding movement in a direction generally perpendicular to the longitudinal axis of the magazine, and said carriage having a pusher element for bearing against the thick edge of the bottom one of the objects in the magazine, and said carriage also having a structural element which is adapted to at least partially support the remaining objects in said stack while the bottom object is being expelled;
 (c) a spring-biased element which is mounted below the magazine, with a distal end of said element carrying a roller which rotates about an axis that is perpendicular to the discharge path of said objects, and said roller being sized such that a peripheral portion of the roller at least partially supports the bottom object in said stack of objects when the apparatus is at rest, and the roller being positioned so as to partially obstruct the gap adjacent the front wall while the objects are at rest, and said roller being movable so as to unblock the gap whenever the bottom object is being expelled from the magazine;
 (d) means for adjusting the elevation of the spring-biased element when it is at rest, whereby the inclination of the bottom object is also adjusted; and
 (e) fluid-operated means for causing said carriage to slide toward and away from the magazine, whereby the bottom object in said magazine may be expelled and the carriage subsequently returned to a position to receive the next object.

14. The apparatus as claimed in claim 12 wherein the spring-biased element constitutes an arm which is pivotable about an axis that is perpendicular to the discharge path of said objects as they leave the magazine.

15. The apparatus as claimed in claim 13 wherein the roller moves from an initial rest position to a second position as the bottom object is being expelled, and wherein the space remaining in the gap when the roller is at its rest position is at least as great as the thickness of a thin edge of the trapezoid-shaped objects but is less than twice the thickness of said thin edge, whereby it is impossible to force two objects into said gap at the same time.

* * * * *